(12) United States Patent
Liu

(10) Patent No.: US 10,943,267 B2
(45) Date of Patent: Mar. 9, 2021

(54) MACHINE LEARNING ASSISTED TARGET SEGMENT AUDIENCE GENERATION

(71) Applicant: Adobe Inc., San Jose, CA (US)

(72) Inventor: Lei Liu, San Jose, CA (US)

(73) Assignee: Adobe Inc., San Jose, CA (US)

( * ) Notice: Subject to any disclaimer, the term of this patent is extended or adjusted under 35 U.S.C. 154(b) by 49 days.

(21) Appl. No.: 16/409,300

(22) Filed: May 10, 2019

(65) Prior Publication Data
US 2020/0357026 A1    Nov. 12, 2020

(51) Int. Cl.
*G06Q 30/02* (2012.01)

(52) U.S. Cl.
CPC ..... *G06Q 30/0271* (2013.01); *G06Q 30/0255* (2013.01)

(58) Field of Classification Search
CPC .......... G06Q 30/0271; G06Q 30/0255
See application file for complete search history.

(56) References Cited

U.S. PATENT DOCUMENTS

| | | | | |
|---|---|---|---|---|
| 10,523,546 | B1 * | 12/2019 | Kavanagh | H04L 67/306 |
| 2003/0212678 | A1 * | 11/2003 | Bloom | G06F 16/285 |
| 2015/0379429 | A1 * | 12/2015 | Lee | G09B 5/00 |
| | | | | 706/11 |
| 2016/0364762 | A1 * | 12/2016 | Maugans, III | G06Q 30/0202 |
| 2019/0244253 | A1 * | 8/2019 | Vij | G06K 9/00677 |
| 2020/0117490 | A1 * | 4/2020 | Sengupta | G06F 3/0482 |

OTHER PUBLICATIONS

"RFM Analysis for Successful Customer Segmentation" (published on Apr. 14, 2017 and screenshot from May 2, 2017 retrieved using Internet Archive Wayback Machine on Nov. 3, 2020 at https://web.archive.org/web/20170502181354/https://www.putler.com/rfm-analysis/ ); (Year: 2017).*

"Recency and Frequency—Audience Manager Help", Retrieved at: https://marketing.adobe.com/resources/help/en_US/aam/c_recency_frequency.html—on May 14, 2019, 3 pages.

* cited by examiner

*Primary Examiner* — James M Detweiler
(74) *Attorney, Agent, or Firm* — FIG. 1 Patents

(57) ABSTRACT

A segment targeting system generates target segment audiences for delivery of digital content. The segment targeting system generates hit recency and frequency summary data, which identifies hit recency and hit frequency for each of multiple cookie identifiers that satisfied a metric in at least one of multiple segments and in a time range in user specified target segment audience criteria. At least a portion of this summary data is used to train a machine learning system. The machine learning system can include multiple machine learning models, with each model being associated with a different false positive to false negative penalty ratio modelling parameter when learning recency and frequency combinations of hits on webpages in each segment that work well to separate cookie identifiers that satisfied a metric for an offering in a target segment and cookie identifiers that satisfied a metric for an offering in other segments.

20 Claims, 10 Drawing Sheets

| cookie_id | session_id | hit_id | timestamp | webpage | order_id | offering_sku |
|---|---|---|---|---|---|---|
| 123456789 | 123456789_1 | 123456789_1_1 | 2019-01-01 22:32:37 | http://www.example.com/aaa.html | | |
| 123456789 | 123456789_1 | 123456789_1_2 | 2019-01-01 22:33:02 | http://www.example.com/aaa.html | | |
| 123456789 | 123456789_2 | 123456789_2_1 | 2019-01-05 10:02:02 | http://www.example.com/bbb.html | | |
| 123456789 | 123456789_3 | 123456789_3_1 | 2019-01-06 11:00:02 | http://www.example.com/ccc.html | | |
| 123456789 | 123456789_3 | 123456789_3_2 | 2019-01-06 11:03:00 | http://www.example.com/ddd.html | 7200010 | 234567 |

| cookie_id | timestamp | order_segment |
|---|---|---|
| 123456787 | 2019-01-05 10:02:02 | others |
| 123456788 | 2019-01-06 09:30:02 | others |
| 123456789 | 2019-01-06 11:03:00 | A |

| cookie_id | session_id | hit_id | recency | segment |
|---|---|---|---|---|
| 123456789 | 123456789_1 | 123456789_1_1 | 5 | A |
| 123456789 | 123456789_1 | 123456789_1_2 | 5 | A |
| 123456789 | 123456789_2 | 123456789_2_1 | 1 | B |

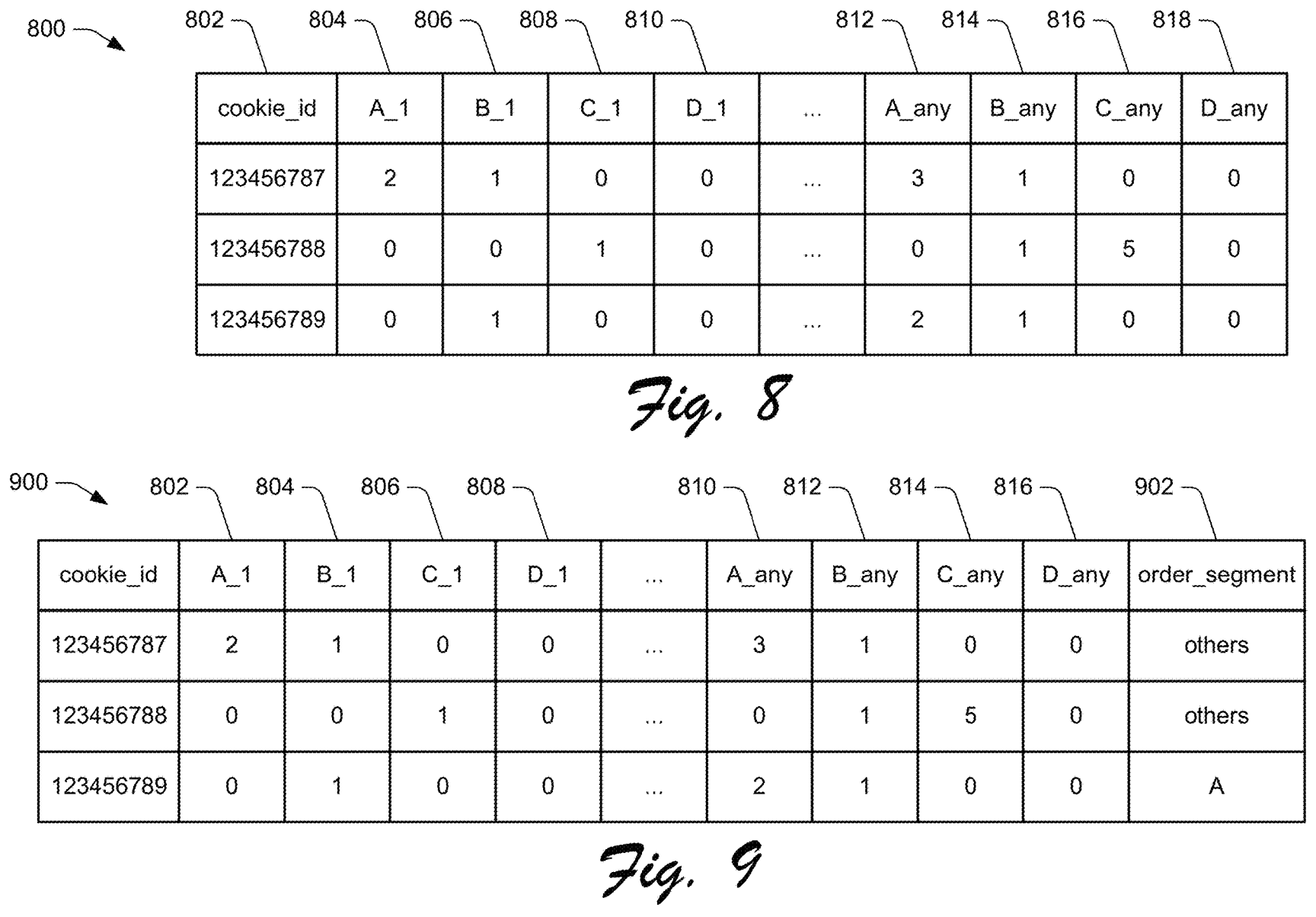

| cookie_id | A_1 | B_1 | C_1 | D_1 | ... | A_any | B_any | C_any | D_any |
|---|---|---|---|---|---|---|---|---|---|
| 123456787 | 2 | 1 | 0 | 0 | ... | 3 | 1 | 0 | 0 |
| 123456788 | 0 | 0 | 1 | 0 | ... | 0 | 1 | 5 | 0 |
| 123456789 | 0 | 1 | 0 | 0 | ... | 2 | 1 | 0 | 0 |

Fig. 9

| cookie_id | A_1 | B_1 | C_1 | D_1 | ... | A_any | B_any | C_any | D_any | order_segment |
|---|---|---|---|---|---|---|---|---|---|---|
| 123456787 | 2 | 1 | 0 | 0 | ... | 3 | 1 | 0 | 0 | others |
| 123456788 | 0 | 0 | 1 | 0 | ... | 0 | 1 | 5 | 0 | others |
| 123456789 | 0 | 1 | 0 | 0 | ... | 2 | 1 | 0 | 0 | A |

MACHINE LEARNING ASSISTED TARGET SEGMENT AUDIENCE GENERATION

BACKGROUND

As computer technology has advanced computers have become increasingly commonplace in our lives and have found a wide variety of different uses. One such use is digital marketing, where businesses communicate digital content, such as advertisements or messages for various products or services, to a target segment audience. One type of target segment audience is a behavioral audience, which is based on users' online browsing activities on a business's websites. For example, for a business selling several types of offerings on its website, target segment audiences can be defined based on whether customers have visited webpages related to one or more of these offerings. Then digital marketers can use these target segment audiences to target customers with online ads to deliver advertisements or messages corresponding to the offerings that are related to the webpages the customers visited.

One technique for generating target segment audiences is to evaluate the recency and frequency of users' visits to the business's websites. Recency refers to how recently the user visited one of the business's websites, and frequency refers to how many times the user visited one of the business's websites. However, identifying proper recency and frequency values to use in generating the target segment audience remains difficult. For example, one common practice is to use one as the frequency condition and no limit for recency. This means if a user viewed one of the business's websites at least once no matter how long ago in time, this user would qualify into the behavioral audience and stay in the behavioral audience forever. This results in a rather inaccurate target segment audience, leaving businesses and digital marketers unsatisfied with their digital marketing services.

SUMMARY

To mitigate the drawbacks of conventional solutions for generating recency and frequency values to use in generating target audiences, a system that generates target segment audiences by leveraging a machine learning system to generate recency and frequency parameters is described. An indication of a target segment and a time range are obtained, the target segment comprising an identifier of a group that includes one or more offerings. The target segment is one of multiple segments each of which comprises an identifier of a different group or category that includes one or more offerings. A hit recency and frequency summary is generated, the hit recency and frequency summary identifying hit recency and hit frequency for each of multiple cookie identifiers that satisfied a metric for at least one offering in the multiple segments in the time range. The hit recency identifies how recently hits occurred, for each cookie identifier, on at least one webpage corresponding to one of the multiple segments prior to the cookie identifier satisfying the metric. The hit frequency identifies how frequently, for each cookie identifier, hits occurred on at least one webpage corresponding to one of the multiple segments prior to the cookie identifier satisfying the metric. Recency and frequency parameters for generating a target segment audience for the target segment and the time range are determined by training a machine learning system with the hit recency and frequency summary. The target segment audience is generated by identifying cookie identifiers that satisfy the recency and frequency parameters, and an instance of digital content is caused to be delivered to users associated with the cookie identifiers in the target segment audience.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 3 illustrates a table showing an example of hit level browsing data.

FIG. 6 illustrates a table showing example cookie level timestamp and order segment identification data.

FIG. 7 illustrates a table showing example hit level recency and segment data.

FIG. 8 illustrates a table showing example hit recency and frequency summary data.

FIG. 9 illustrates a table showing example hit recency and frequency summary data with segment data.

DETAILED DESCRIPTION

Overview

Figure 1:
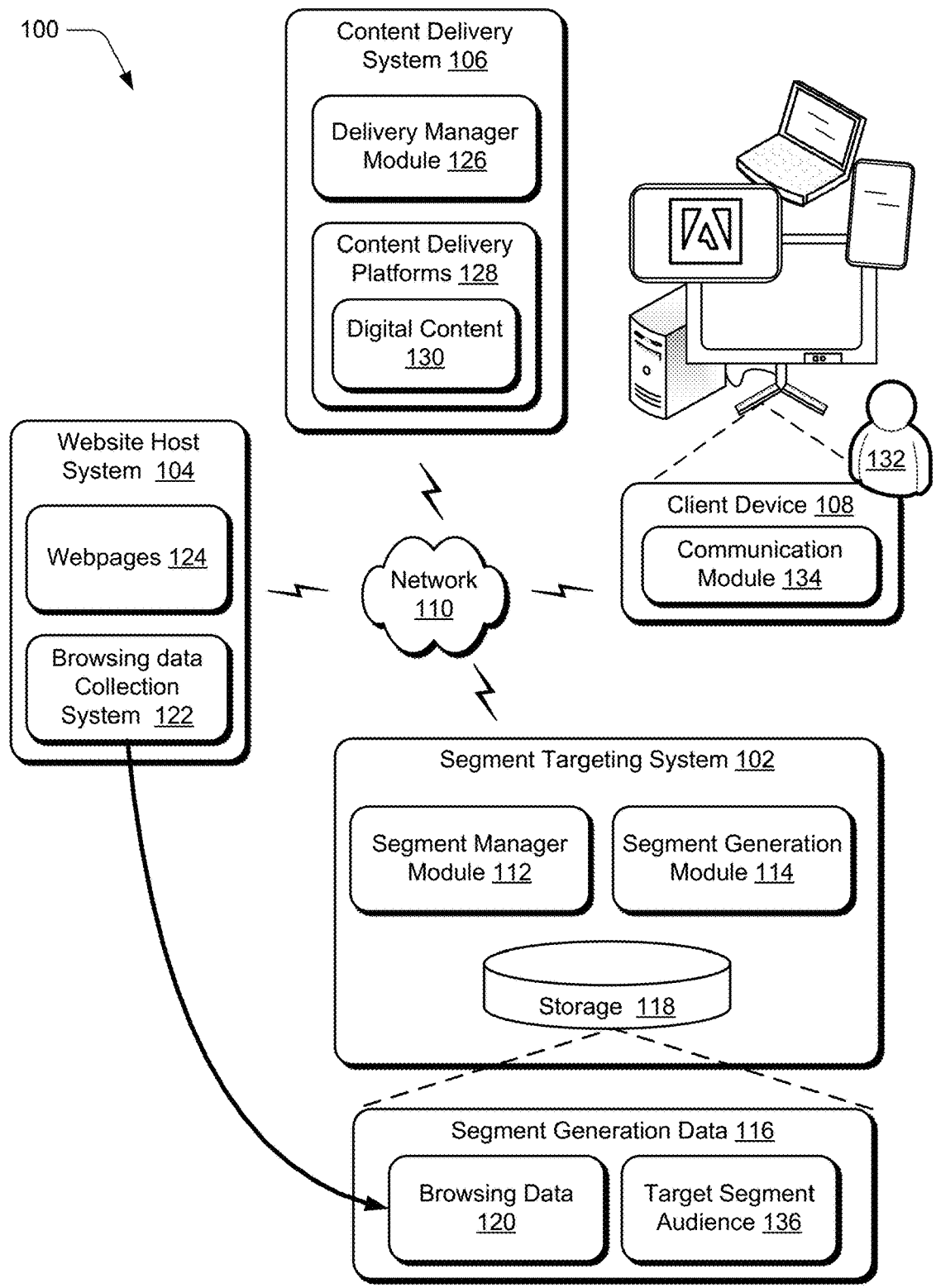
FIG. 1 is an illustration of a digital medium environment in an example implementation that is operable to employ the machine learning assisted target segment audience generation described herein.

Techniques for machine learning assisted target segment audience generation are described herein. Generally, in one or more implementations, a segment targeting system determines parameters to use to generate a target segment audience, such as recency and frequency parameters, to which various types of content can be delivered. The segment targeting system generates the target segment audience by identifying users that satisfy using these recency and frequency parameters, and provides the target segment audience to a content delivery system. Further, a particular instance of digital content is identified as being targeted to the target segment audience. Examples of digital content include advertisements for products and services, coupons or other offers, public service announcements, informational content, and so forth.

The content delivery system leverages one or more of various content delivery platforms to deliver digital content to the target segment audience. A user of a client device in the target segment audience leverages a communication module to interact with a particular content delivery platform and to consume an instance of the digital content. Accordingly, the content delivery system can deliver the instance of the digital content to the users in the target segment audience.

More specifically, businesses can group their offerings into multiple different groups or categories referred to as segments. Browsing data is collected for a business's website(s) over a span of time (e.g., weeks, months, years, etc.) for the multiple segments. The segment targeting system receives target segment audience criteria that specifies a target segment and a time range. In one or more implementations, the segment targeting system identifies multiple occurrences of webpage hits in the collected browsing data over the specified time range that resulted in a metric being satisfied. For each hit occurrence that satisfied a metric, hit level browsing data is extracted from the collected browsing data for each hit occurrence in the collected browsing data that corresponds to the same cookie identifier as the cookie identifier in the hit occurrence that satisfied the metric. This extracted hit level browsing data can include hit level browsing data in the specified time range as well as hit level browsing data from prior to the specified time range. The hit level browsing data includes various data for each of the multiple hit occurrences, including at least an identifier of a cookie corresponding to the hit occurrence, a timestamp of the hit occurrence, an order identifier for any offering that was ordered or purchased as part of the hit occurrence, and an identifier of any offering that was ordered or purchased as part of the hit occurrence.

The segment targeting system then generates hit level recency and segment data based on the hit level browsing data. The hit level recency and segment data identifies, for each hit occurrence in the hit level browsing data, how recent the hit occurrence was to the hit occurrence that satisfied the metric, and what segment the hit occurrence corresponds to. To generate the hit level recency and segment data, the segment targeting system identifies all cookie identifiers in the time range that satisfied a metric (e.g., which ordered, purchased, or downloaded an offering). For each such cookie identifier, all hit occurrences in the hit level browsing data that happened prior to the first hit occurrence in a browsing session in which a metric was satisfied are identified. Based on the particular webpage being accessed as part of the hit occurrence, a segment corresponding to the hit occurrence is also identified. A time difference (e.g., rounded to the nearest day) between each of these hit occurrences and the first hit occurrence in a session in which a metric was satisfied are determined. These time differences and segments are the hit level recency and segment data.

The segment targeting system also generates hit recency and frequency summary data, which identifies hit recency and hit frequency for each of multiple cookie identifiers that satisfied a metric in one of the multiple segments and in the time range specified in the target segment audience criteria. Multiple buckets corresponding to the recency of the hit occurrences as well as one of the multiple segments are identified, each bucket including hit occurrences having occurred on at least one webpage corresponding to that segment within a threshold amount of time. Different ones of these buckets correspond to different threshold amounts of time (e.g., one corresponds to within 1 day, another corresponds to within 3 days, another corresponds to within 5 days, etc.). For each hit occurrence for a cookie identifier in the hit level recency and segment data, the hit occurrence is included in the appropriate one or more of the buckets. The number of hit occurrences in each of these buckets is counted, which is the hit frequency for the bucket. The segment corresponding to the cookie identifier in the hit recency and frequency summary data is also identified, which results in hit recency and frequency summary data with segment data.

A portion of the hit recency and frequency summary data with segment data is used as training data to train a machine learning system. In one or more implementations, the machine learning system includes multiple (e.g., 5) machine learning models. Each machine learning model learns recency and frequency combinations of hits on webpages in each segment that work well to separate cookie identifiers that satisfied a metric for an offering in the target segment and cookie identifiers that satisfied a metric for an offering in other segments. The target segment refers to the segment identified in the target segment audience criteria. Each such machine learning model uses a different false positive to false negative penalty ratio as a modelling parameter to achieve different levels of accuracy and reach for the learned recency and frequency combinations. These learned recency and frequency combinations are used to generate rules that are the recency and frequency parameters used to generate the target segment audience.

Another portion of the hit recency and frequency summary data with segment data can be used as validation data to validate the machine learning system. The validation data is used to determine the accuracy and reach for each of the multiple machine learning models.

The segment targeting system can display an indication of the machine learning models as well as the accuracy and reach for each such model. This allows a user of the segment targeting system to select which model he prefers to get the accuracy or reach he desires. The segment targeting system then searches the collected browsing data for cookie identifiers that satisfy the recency and frequency parameters generated by the selected model, and uses those cookie identifiers as the target segment audience.

The techniques discussed herein provide a quick, easy to use, and user friendly segment targeting system for users such as digital marketers. The user can simply identify the target segment for which he desires a target segment audience, and a time range that he desires the segment targeting system to use in creating the target segment audience. Optionally, the user also selects one of multiple reach and accuracy combinations he desires the target segment audience to have. The target segment audience is then automatically generated for the user. The user need not expend time, money, and computational resources performing various test experiments (e.g., multivariate or A/B test experiments) to identify recency and frequency parameters.

Additionally, in contrast to conventional systems that generate target segment audiences, the techniques discussed herein allow a user of the segment targeting system to select, from multiple different reach and accuracy combination options, the reach and accuracy combination he desires the target segment audience to have. The user need not simply guess or expend computational resources in an attempt to figure out what the appropriate combinations of recency and frequency are in order to obtain a particular reach and accuracy combination. Rather, the options of available reach and accuracy combinations are automatically determined and presented to the user.

Furthermore, the techniques discussed herein are data driven, generating recency and frequency parameters based on various website browsing attributes for large sets of users. As a result, the techniques discussed herein can outperform conventional approaches that are based on a digital marketer's empirical experience or simple business rules (e.g., baseline techniques that use a frequency of one and no recency limit), generating more accurate target segment audiences. Furthermore, the user need not have specialized knowledge regarding selection of recency and frequency parameters, but can rely on the segment targeting system to generate that specialized knowledge.

Term Descriptions

These term descriptions are provided for purposes of example only and are not intended to be construed as limiting on the scope of the claims.

The term "offering" refers to an item or service that is made available to users. Examples of offerings include products, services, digital content such as papers or movies, and so forth.

The term "segment" refers to a group or category that an offering is part of Businesses or people can group their offerings in any manner they desire. For example, products may be grouped by their functionality (e.g., video editing products, image editing products, word processing products, and so forth). By way of another example, products may be grouped by the manner in which they are purchased (e.g., monthly service fee, annual service fee, single-user license, multi-user license, and so forth). By way of yet another example, digital content may be grouped by its subject matter (e.g., science fiction movies, historical movies, horror movies, comedy movies, and so forth). The segment into which an offering is grouped is also referred to as the offering segment.

The term "recency" refers to how recently a user corresponding to a cookie visited one of a business's or person's websites. For example, the recency can be a number of days prior to a particular event (e.g., a product purchase) that an access to a website was made by a user corresponding to the cookie.

The term "frequency" refers to how many times a user corresponding to a cookie visited one of the business's or person's websites.

The term "hit" refers to a user accessing or using a webpage, such as by initially requesting the webpage be displayed, or by clicking on or otherwise selecting an object on the webpage. For example, a hit can be user selection of a link that takes the user to a different webpage, user selection of an object to play back audio or video on the webpage, user selection of a link that jumps the user to a different part of the webpage, and so forth.

The term "browsing data" refers to various website browsing attributes for large sets of users. For example, the browsing data can include various information regarding a user that accesses one or more of the webpages, such as a cookie identifier (e.g., a user identification code) corresponding to the user, a timestamp of each user click or user selection on a webpage (e.g., each link accessed), a webpage accessed, and so forth.

The term "target segment audience" refers to the intended audience of content, such as a digital advertisement or message, for a particular offering in the segment. A target segment audience is generated, for example, based on output from a machine learning model that processes individual user data (e.g., browsing data) to generate recency and frequency parameters.

The term "metric" refers to an action taken on one or more webpages that a business or someone desires to track. Examples of metrics include ordering a product or service, adding a product or service to an online shopping cart, downloading digital content, streaming digital content, and so forth. A metric is satisfied when the action is taken. For example, the metric is satisfied when a product or service is ordered, a product or service is added to an online shopping cart, digital content is downloaded, digital content is streamed, and so forth.

The term "accuracy" refers to the accuracy of a target segment audience. The accuracy of a target segment audience indicates how accurate the target segment audience is in identifying users that are interested in the segment.

The term "reach" refers to the reach of a target segment audience. The reach of a target segment audience indicates how well the target segment audience identifies users that are interested in the segment.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the machine learning assisted target segment audience generation described herein. The illustrated environment 100 includes a segment targeting system 102, a website hosting system 104, a content delivery system 106, and a client device 108 that are communicatively coupled, one to another, via a network 110.

Computing devices that are usable to implement the segment targeting system 102, the website hosting system 104, the content delivery system 106, and the client device 108 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to low resource devices with limited memory and/or processing resources (e.g., mobile devices). Additionally, a computing device may be representative of a plurality of different devices, such as multiple servers utilized by a business to perform operations "over the cloud" as further described in relation to FIG. 13.

The segment targeting system 102 includes a segment manager module 112 and a segment generation module 114. The segment manager module 112 is representative of functionality to determine parameters to use to generate a target segment audience, such as recency and frequency values, to which various types of content can be delivered.

To generate such target segment audiences, the segment generation module 114 uses browsing data 120 in a storage 118. The storage 118 can be any one or more of a variety of different types of storage, such as random access memory (RAM), Flash memory, solid state drive, magnetic disk drive, and so forth. The browsing data 120 generally represents various website browsing attributes for large sets of users. The browsing data 120 is collected by a browsing data collection system 122 on the website hosting system 104. The browsing data collection system 122 monitors and collects data regarding users' browsing behavior on the webpages 124 of the website hosting system 104. In one or more implementations, the browsing data collection system 122 collects various information regarding a user that accesses one or more of the webpages 124, such as a cookie identifier (e.g., a user identification code included in a cookie) corresponding to the user, a timestamp of each user click or user selection on a webpage (e.g., each link accessed), a webpage accessed, and so forth. This collected data is stored as browsing data 120. The browsing data 120 and its use are discussed in more detail below.

The content delivery system 106 includes a delivery manager module 126 that implements and exposes content delivery platforms 128. The content delivery platforms 128 represent different mediums by which content can be exposed, such as websites, network-accessible applications, content streaming services, television stations, radio stations, and so forth. The content delivery platforms 128 are leveraged by the delivery manager module 126 to deliver digital content 130. Examples of the digital content 130 include advertisements for products and services, coupons or other offers, public service announcements, informational content, and so forth. Although discussed herein with reference to digital content, the techniques discussed herein can be employed with other types of content delivery, such as mailings via the postal service.

A user 132 of the client device 108 leverages a communication module 134 to interact with a particular content delivery platform 128 and to consume an instance of the digital content 130. The communication module 134 generally represents functionality for presenting content on the client device 108. Examples of the communication module 134 include a web browser, a network-enabled application (e.g., an email application), a television receiver, and so on, that can obtain content data from the content delivery system 106 via the network 110, and output the digital content 130 via the client device 108.

According to techniques for machine learning assisted target segment audience generation, the segment manager module 112 uses the browsing data 120 to generate training data to train a machine learning system to determine parameters to use to generate a target segment audience 136, such as recency and frequency parameters (e.g., values or rules). The segment generation module 114 is representative of functionality to use these parameters to process the browsing data 120 and generate a targeted segment audience 136. The target segment audience 136 can then be used to provide targeted delivery of content, such as the digital content 130.

For example, the segment targeting system 102 can provide the content delivery system 106 with a target segment audience 136 that includes the user 132. Further, a particular instance of the digital content 130 (e.g., an advertisement) is identified as being targeted to the target segment audience 136. Accordingly, the delivery manager module 126 can deliver the instance of the digital content 130 to the user 132. Accordingly, by generating and implementing the target segment audiences, the probability that the digital content 130 will be delivered to an intended audience is greatly increased.

The content delivery system can deliver an instance of the digital content 130 to the user 132 in a variety of different manners. For example, the content delivery platform 128 can send an email to the user 132 (e.g., an email address associated with a cookie identifier in the target segment audience 136). By way of another example, when the user 132 accesses the website hosting system 104, the website hosting system 104 can contact the content delivery platform 128 and provide the cookie corresponding to the user 132 to the content delivery system 106, which then returns an instance of digital content to the website hosting system 104 based on the user 132 being associated with a cookie identifier in the target segment audience 136. The website hosting system 104 can then communicate the instance of digital content to the client device 108 for display or other presentation to the user 132.

Segment Targeting System Architecture

Figure 2:
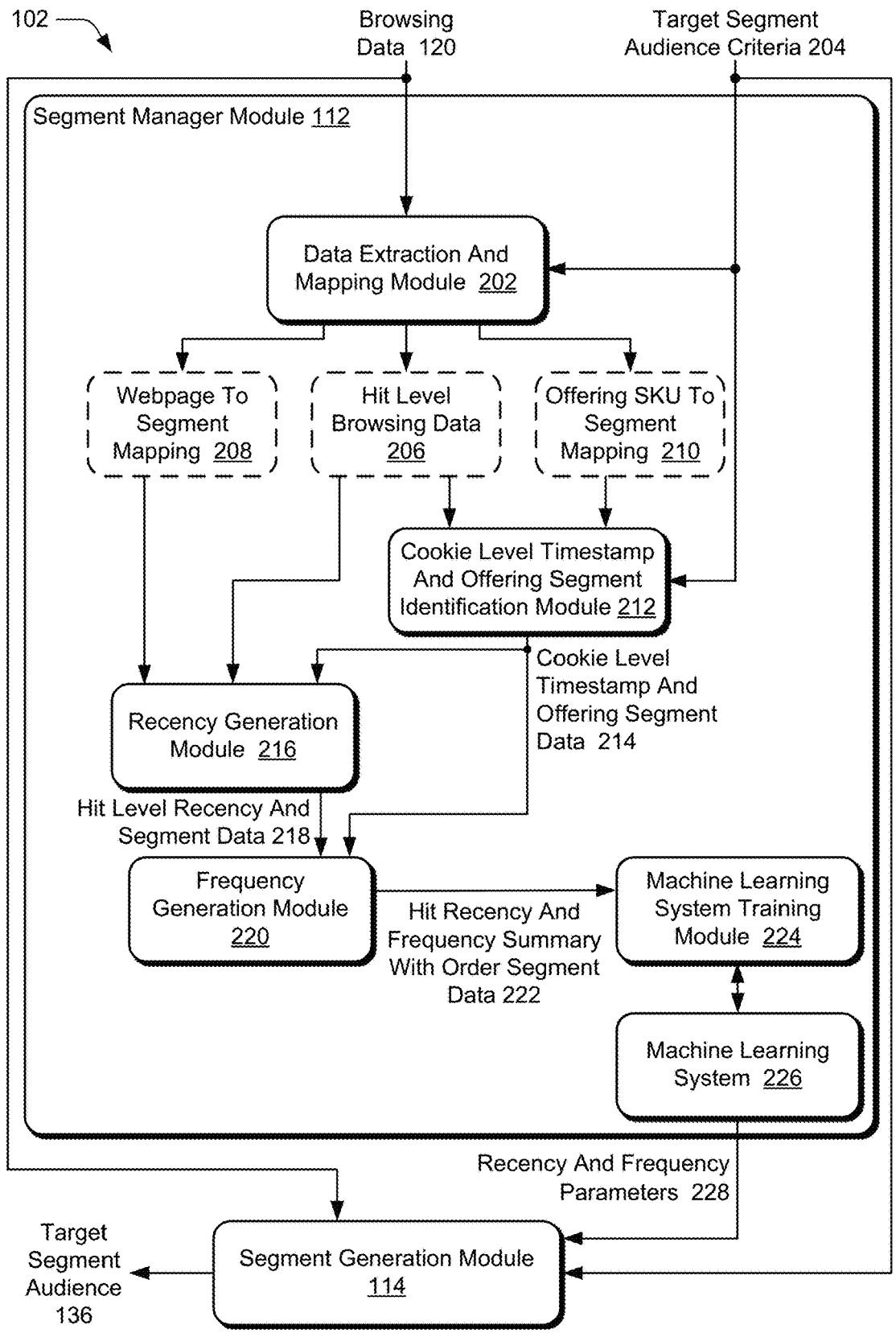
FIG. 2 is an illustration of an example architecture of a segment targeting system.

FIG. 2 is an illustration of an example architecture of a segment targeting system 102. The segment targeting system 102 includes the segment manager module 112 and the segment generation module 114 as discussed above. The segment manager module 112 includes a data extraction and mapping module 202 that receives browsing data 120 and target segment audience 204.

The target segment audience criteria 204 is received as a user input and identifies the user's criteria for the target segment audience 136. In one or more implementations, the target segment audience criteria 204 includes an identifier of a time range and a target segment. The browsing data 120 is collected over some span of time, and the time range refers to what range within that span of time the user desires to have the target segment audience 136 based on. The user can specify any dates or times within the span of time. For example, the user may request that only collected data over the past two months be used, that only data collected from 8:00 AM to 11:00 AM over the past month be used, that only data collected on Mondays during the past three months be used, and so forth.

In one or more implementations, the browsing data 120 is clickstream data, which is data regarding user access to one or more webpages of a website. As discussed above, the browsing data 120 is collected by the browsing data collection system 122 of the website hosting system 104 while users are accessing the webpages 124. In one or more implementations, the data extraction module 202 identifies particular data in the browsing data 120 and outputs that particular data as hit level browsing data 206, also referred to as extracting the data. The data extraction module 202 identifies each hit occurrence within the time range specified in the target segment audience criteria 204 that resulted in a metric being satisfied. For the cookie identifier associated with each such hit occurrence, the data extraction module 202 extracts data for each hit occurrence in the browsing data 120 that corresponds to the cookie identifier. Thus, for each hit occurrence that corresponds to a cookie identifier, that occurred within the specified time range, and that resulted in a metric being satisfied, data for other hit occurrences by that same cookie identifier both within the specified time range and prior to the specified time range is extracted from the browsing data 120. Additionally or alternatively, the data is extracted for each occurrence of a hit in the browsing data 120 within the time range specified in target segment audience criteria 204.

In one or more implementations, this extracted data includes, for each occurrence of a hit in the browsing data 120, a cookie identifier, a session identifier, a hit identifier, a timestamp, a webpage identifier, an order identifier, and an offering stock keeping unit (SKU). The cookie identifier is a user identification code (e.g., included in a cookie). The cookie identifier is a tracking mechanism that allows different users to be distinguished from one another, but need not reveal the actual identity of the user. The cookie identifier is typically maintained in a file or other record on the computing device 108, and is communicated to the website hosting system 104 when the user is accessing the webpages 124.

For each cookie identifier there can be multiple sessions, each session corresponding to an occurrence of the user accessing the website hosting system 104. Each time the user begins browsing the webpages 124 of the website hosting system 104 begins a session, and the session ends when the user browses away from the webpages 124 (e.g., browses to another website or closes his web browser). Each session is labeled with a session identifier. During each session, there can be one or more hits, each of which is labeled with a hit identifier. Each hit has a corresponding timestamp and an indication of the webpage on which the hit occurred. Furthermore, if the hit results in a metric being satisfied, then the browsing data 120 also includes an order identifier that identifies an order corresponding to the metric being satisfied. For example, the order identifier can be an order identifier for a product or service that is ordered or purchased, an order identifier for digital content that is downloaded or streamed, a temporary order identifier or shopping cart identifier for digital content added to an online shopping cart, and so forth. Additionally, if the hit results in a metric being satisfied, then the browsing data also includes an offering SKU identifying the offering corresponding to the metric being satisfied. By way of example, if the metric is ordering a product and the hit triggers an order for a product, then the order identifier includes an identifier of the order and the offering SKU includes an identifier of the product that was ordered.

In one or more embodiments, the browsing data collection system 122 collects data for a single metric (e.g., product purchases, digital content downloads, and so forth). Additionally or alternatively, the browsing data collection system 122 can collect data for multiple metrics. In such situations, the user of the segment targeting system 102 can provide an input to the segment targeting system 102 specifying which one or more metrics are to be used when generating the target segment audience 136.

FIG. 3 illustrates a table 300 showing an example of hit level browsing data 206. The table 300 is also referred to as a hit level web browsing data table. The table 300 illustrates example data for five hit occurrences. However, it should be noted that the extracted data typically includes significantly more data, such as tens of thousands or millions of occurrences.

As illustrated in table 300, for each hit occurrence in the browsing data 120, the extracted data includes a cookie identifier (cookie_id) 302, a session identifier (session_id) 304, a hit identifier (hit_id) 306, a timestamp 308, a webpage identifier 310, an order identifier (order_id) 312, and an offering SKU (offering_sku) 314.

Returning to FIG. 2, the data extraction and mapping module 202 also obtains a webpage to segment mapping 208 and an offering SKU to segment mapping 210. The webpage to segment mapping 208 maps all the distinct webpages 124 on the website hosting system 104 to a segment. This mapping 208 can be generated in various different manners, such as being previously generated by an administrator or manager of the website hosting system 104, being automatically generated based on the content of the webpages, and so forth. The offering SKU to segment mapping 210 maps all the distinct offering SKUs to a segment. This mapping 210 can be generated in various different manners, such as being previously generated by an employee of the business describing its offerings on the website hosting system 104, being automatically generated based on the content of the webpages, and so forth.

Figure 4:
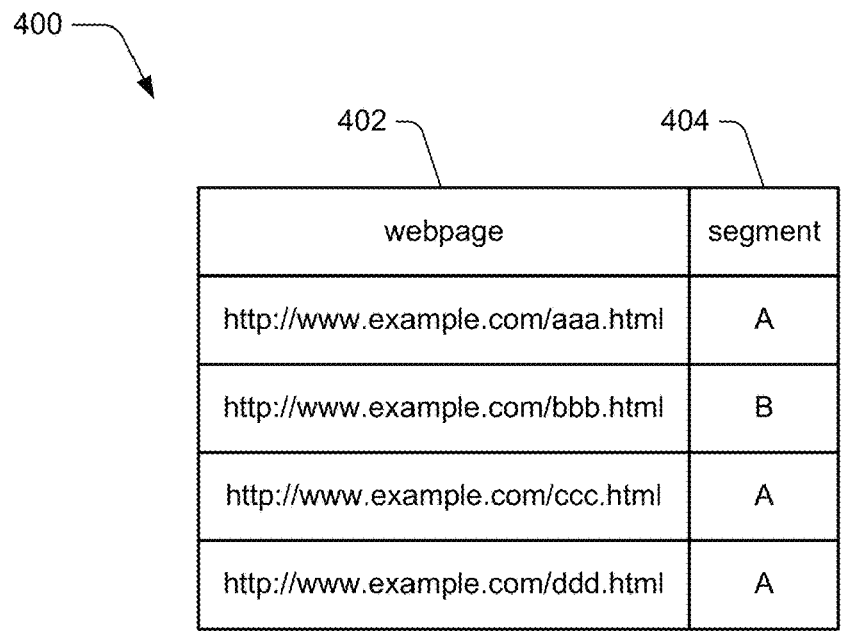
FIG. 4 illustrates a table showing an example webpage to segment mapping.

FIG. 4 illustrates a table 400 showing an example webpage to segment mapping 208. The table 400 is also referred to as a webpage to segment mapping table. The table 400 illustrates example mappings for four webpages. However, it should be noted that there can be many more webpages mapped to segments, such as hundreds or thousands of mappings. As illustrated in table 400, for each webpage the mapping includes a webpage identifier 402 and a segment identifier 404.

Figure 5:
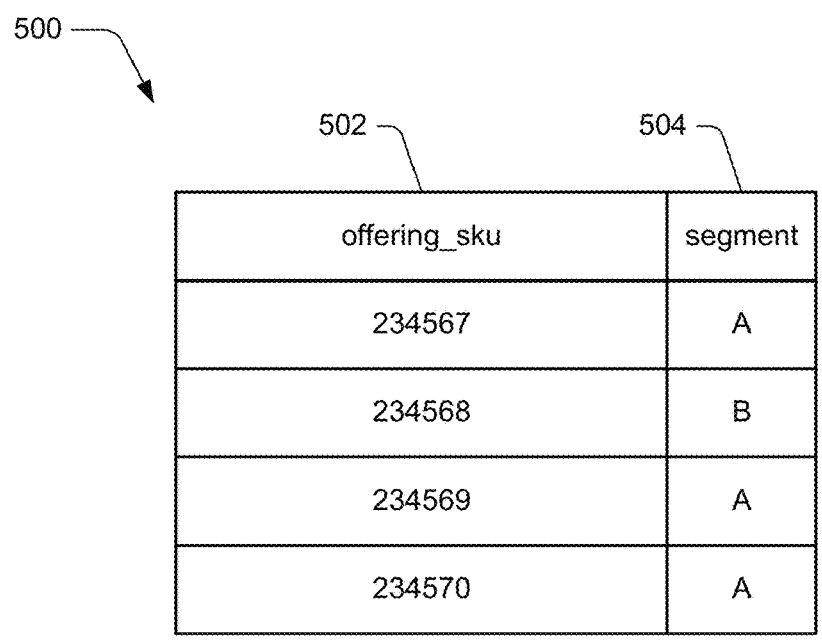
FIG. 5 illustrates a table showing an example offering stock keeping unit (SKU) to segment mapping.

FIG. 5 illustrates a table 500 showing an example offering SKU to segment mapping 210. The table 500 is also referred to as an offering SKU to segment mapping table. The table 500 illustrates example mappings for four offering SKUs. However, it should be noted that there can be many more offering SKUs mapped to segments, such as hundreds or thousands of mappings. As illustrated in table 500, for each webpage the mapping includes an offering SKU (offering_sku) 502 and a segment identifier 504.

Returning to FIG. 2, the cookie level timestamp and order segment identification module 212 receives the hit level browsing data 206, the offering SKU to segment mapping 210, and the target segment audience criteria 204. As discussed above, a segment refers to a group or category of offerings that an entity (e.g., business, person, organization, etc.) offers or describes on their webpages 124. For example, a business may sell four different classes of products (e.g., video editing software, photo editing software, drawing software, and word processing software) and each class of products is a different segment. A target segment refers to one of these groups or categories of offerings for which a target segment audience is desired. The user can specify any segment to have the target segment audience 136 based on. This allows the user to have, for example, a target segment audience 136 that includes users that are likely to be interested in a coupon for a particular offering (e.g., the business's video editing software). Although discussed herein with reference to a single segment being specified by the user, additionally or alternatively multiple segments can be specified.

The cookie level timestamp and order segment identification module 212 uses the hit level browsing data 206 to identify the cookie identifier, timestamp, and offering SKU identifier for each cookie identifier that satisfied a metric within the time range specified in the target segment audience criteria 204. The cookie level timestamp and order segment identification module 212 also uses the offering SKU to segment mapping 210 to identify the segment corresponding to each such cookie identifier that satisfied a metric. The cookie level timestamp and order segment identification module 212 maintains an indication that either the segment corresponding to the cookie identifier that satisfied a metric is the same segment as specified in the target segment audience criteria 204, or the segment corresponding to the cookie identifier that satisfied a metric is not the same segment as specified in the target segment audience criteria 204. This indication is referred to as the order segment. Thus, rather than storing a value that identifies which segment the cookie identifier corresponds to, the order segment stores a Boolean value indicating that the cookie identifier either is or is not the same segment as specified in the target segment audience criteria 204.

The cookie level timestamp and order segment identification module 212 outputs cookie level time stamp and order segment identification data 214 that identifies, for each hit occurrence that satisfied a metric within the time range specified in the target segment audience criteria 204, the cookie identifier, the timestamp, and the segment for the hit occurrence.

FIG. 6 illustrates a table 600 showing example cookie level timestamp and order segment identification data 214. The table 600 is also referred to as a cookie level timestamp and order segment identification table.

As illustrated in table 600, for each cookie identifier that satisfied a metric (e.g., placed an order) within the time range specified in the target segment audience criteria 204, the table 600 includes a cookie identifier (cookie_id) 602, a timestamp 604, and a segment (order segment) 606 indicating that the offering segment corresponding to the metric being satisfied either is or is not the same offering segment as specified in the target segment audience criteria 204. The table 600 illustrates example mappings for three cookie identifiers. However, it should be noted that there can be many cookie identifiers, such as tens of thousands or millions of cookie identifiers.

Returning to FIG. 2, a recency generation module 216 receives the hit level browsing data 206, the webpage to segment mapping 208, and the cookie level timestamp and order segment identification data 214, and generates hit level recency and segment data 218. The recency generation module 216 finds all hit occurrences in the hit level browsing data 206 for the cookie identifiers identified in the cookie level time stamp and order segment identification data 214 that happened prior to the first hit of their metric satisfaction sessions. A metric satisfaction session refers to a session in which the metric was satisfied. The recency generation module 216 adds the cookie identifier, the session identifier, and the hit identifier for each such hit occurrence to the hit level recency and segment data 218. The recency generation module 216 excludes hits within the metric satisfaction session to avoid inflating pre metric satisfaction frequency counts because hits within the metric satisfaction session are usually large. However, additionally or alternatively the recency generation module 216 finds all hit level browsing data 206 for the cookie identifiers identified in the cookie level timestamp and order segment identification data 214 regardless of which session the hits occurred in. The recency generation module 216 also uses the webpage to segment mapping 208 to identify the segment corresponding to the webpage on which the hit occurred (as indicated in the hit level browsing data 206), and adds the segment to the hit level recency and segment data 218.

Furthermore, the recency generation module 216 identifies the timestamp of the hit occurrence that resulted in a metric being satisfied. For each hit occurrence that the recency generation module 216 includes in the hit level recency and segment data 218, the recency generation module 216 determines the difference between the timestamp of the hit occurrence and the timestamp of the first hit of a metric satisfaction session. In one or more implementations this difference in timestamps is rounded to an integer indicating a number of days. Additionally or alternatively, the difference can be specified in other manners, such as being rounded to an integer indicating a number of hours, a number of minutes, a number of weeks, and so forth. Additionally or alternatively, the difference in timestamps need not be rounded.

FIG. 7 illustrates a table 700 showing example hit level recency and segment data 218. The table 700 is also referred to as a hit level recency and segment table.

As illustrated in table 700, for each hit occurrence in the hit level browsing data 206 for the cookie identifiers identified in the cookie level timestamp and order segment identification data 214 that happened prior to the first hit of their metric satisfaction sessions, the table 700 includes a cookie identifier (cookie_id) 702, a session identifier (session_id) 704, a hit identifier (hit_id) 706, a recency value 708 and a segment 710. The recency value 708 is the difference between the timestamp of the hit occurrence and the timestamp of the hit occurrence that resulted in a metric being satisfied (e.g., rounded to the nearest number of days). The segment 710 indicates the segment corresponding to the webpage on which the hit occurred. The table 700 illustrates example data for three hit occurrences. However, it should be noted that there can be many hit occurrences, such as tens of thousands or millions of hit occurrences.

Returning to FIG. 2, a frequency generation module 220 receives the hit level recency and segment data 218, and generates hit recency and frequency summary with order segment data 222. The hit recency and frequency summary data identifies hit recency and hit frequency for each of multiple cookie identifiers that satisfied a metric in the segment and the time range specified in the target segment audience criteria 204. The frequency generation module 220 identifies multiple buckets or groups corresponding to the recency of the hit occurrences. Each such bucket or group corresponds to a hit occurrence having occurred on at least one webpage corresponding to the segment within a threshold amount of time (e.g., a threshold number of days), with different buckets or groups corresponding to different threshold amounts of time. For each hit occurrence for a cookie identifier in the hit level recency and segment data 218, the frequency generation module 220 includes the hit occurrence in one or more of the buckets or groups.

In one or more implementations, the frequency generation module 220 identifies twelve buckets: 1 day, 3 days, 5 days, 7 days, 15 days, 30 days, 60 days, 90 days, 120 days, 180 days, 360 days, and "any" days. The 1 day bucket refers to the hit occurrence being within the past 1 day of the first hit of a metric satisfaction session, the 3 day bucket refers to the hit occurrence being within the past 3 days of the first hit of a metric satisfaction session, the 5 day bucket refers to the hit occurrence being within the past 5 days of the first hit of a metric satisfaction session, the "any" days bucket refers to the hit occurrence being any number of days prior to the first hit of a metric satisfaction session, and so forth. It should be noted that a hit occurrence can be included in multiple such buckets. For example, if the hit occurrence was 45 days before the first hit of a metric satisfaction, then the hit occurrence is included in the 60 days, 90 days, 120 days, 180 days, 360 days, and "any" days buckets, but is not included in the 1 day, 3 days, 5 days, 7 days, 15 days, and 30 days buckets.

The frequency generation module 220 counts the number of hit occurrences in each of these buckets, which is the hit frequency for the bucket. This results in multiple combinations of recency and frequency features. For example, for four offering segments, A, B, C, and D, there are total of 4×12=48 combinations of recency and frequency features.

FIG. 8 illustrates a table 800 showing example hit recency and frequency summary data. The table 800 is also referred to as a hit recency and frequency summary table.

As illustrated in table 800, for cookie identifier in the hit level recency and segment data 218, the frequency of hit occurrences in each bucket for each segment is illustrated. The table 800 includes a cookie identifier (cookie_id) 802, a bucket A_1 804 which is a 1 day bucket for segment A, a bucket B_1 806 which is a 1 day bucket for segment B, a bucket C_1 808 which is a 1 day bucket for segment C, a bucket D_1 810 which is a 1 day bucket for segment D, a bucket A_>360 812 which is an "any" days bucket (a no recency limit) bucket for segment A, a bucket B_>360 814 which is an "any" days bucket (a no recency limit) bucket for segment B, a bucket C_>360 816 which is an "any" days bucket (a no recency limit bucket) for segment C, and a bucket D_>360 818 which is an "any" days bucket (a no recency limit) bucket for segment D. For example, table 800 illustrates that, for segment A, cookie identifier 123456787 had 2 hit occurrences within the past 1 day and 3 hit occurrences with no recency limit. For segment B, cookie identifier 123456787 had 1 hit occurrence within the past 1 day and 1 hit occurrence with no recency limit.

Although only eight recency and frequency combinations are illustrated in table 800, it should be noted that the number of recency and frequency combinations depends on the number of buckets and the number of offering segments. For example, as discussed above for 4 offering segments and 12 buckets there are 48 recency and frequency combinations. It should also be noted that the table 800 illustrates example data for three cookie identifiers. However, it should be noted that there can be many cookie identifiers, such as tens of thousands or millions of cookie identifiers.

Returning to FIG. 2, it should be noted that situations can arise in which multiple hit occurrences for a cookie identifier result in a metric being satisfied within the time range specified in the target segment audience criteria 204. For example, a user corresponding to a cookie may order two products (in the same or different segments) within the time range specified in the target segment audience criteria 204.

The frequency generation module 220 can account for multiple hit occurrences resulting in a metric being satisfied in a variety of different manners. In one or more implementations, each of the hit occurrences that satisfied a metric is used in generating the hit recency and frequency summary data as discussed above except when identifying previous hit occurrences any other hit occurrences that also satisfied a metric are excluded. For example, assume that for the same cookie identifier, on January 1 there is one hit occurrence, on January 5 there are five hit occurrences one of which satisfies a metric, on January 8 there is one hit occurrence, and on January 20 there are seven hit occurrences one of which satisfies a metric. Due to the January 5 hit occurrence that satisfied a metric, there is one hit occurrence four days ago (the January 1 hit occurrence) that gets added to the hit recency and frequency summary data. Additionally, due to the January 20 hit occurrence that satisfied a metric, there is one hit occurrence 19 days ago (due to the January 1 hit occurrence) that gets added to the hit recency and frequency summary data and one hit occurrence 12 days ago (due to the January 8 hit occurrence) that gets added to the hit recency and frequency summary data.

Additionally or alternatively, each of the hit occurrences that satisfied a metric are used in generating the hit recency and frequency summary data as discussed above, regardless of whether the previous hit occurrences also satisfied a metric. E.g., in the previous example, the January 5 hit occurrence may not be excluded. Thus, due to the January 5 hit occurrence that satisfied a metric, there is one hit occurrence four days ago (the January 1 hit occurrence) that gets added to the hit recency and frequency summary data. Additionally, due to the January 20 hit occurrence that satisfied a metric, there is one hit occurrence 19 days ago (due to the January 1 hit occurrence) that gets added to the hit recency and frequency summary data, five hit occurrences 15 days ago (due to the January 5 hit occurrences) that get added to the hit recency and frequency summary data, and one hit occurrence 12 days ago (due to the January 8 hit occurrence) that gets added to the hit recency and frequency summary data.

The frequency generation module 220 also uses cookie level timestamp and order segment identification data 214 to identify the segment corresponding to the cookie identifier in the hit recency and frequency summary data. An indication of the segment is added to the hit recency and frequency summary data, resulting in hit recency and frequency summary data with segment data 222. As discussed above when discussing the cookie level timestamp and order segment identification data 214, the indication of the segment that is added to the hit recency and frequency data indicates that the offering segment corresponding to the cookie identifier either is or is not the same segment as specified in the target segment audience criteria 204.

FIG. 9 illustrates a table 900 showing example hit recency and frequency summary data with segment data 222. The table 900 is also referred to as a hit recency and frequency summary with segment data table.

Table 900 is analogous to table 800 of FIG. 8, except that table 900 includes a segment (order segment) 902 indicating that the segment corresponding to the cookie identifier either is or is not the same segment as specified in the target segment audience criteria 204.

Returning to FIG. 2, the hit recency and frequency summary data with segment data 222 is input to a machine learning system training module 224 to train a machine learning system 226 to generate recency and frequency parameters 228. The machine learning system 226 can implement any type of machine learning technique to enable generation of the recency and frequency parameters as described herein. Further, such a machine learning model uses one or more of supervised learning, unsupervised learning, or reinforcement learning. For example, the machine learning model can include, but is not limited to, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, or combinations thereof.

Figure 10:
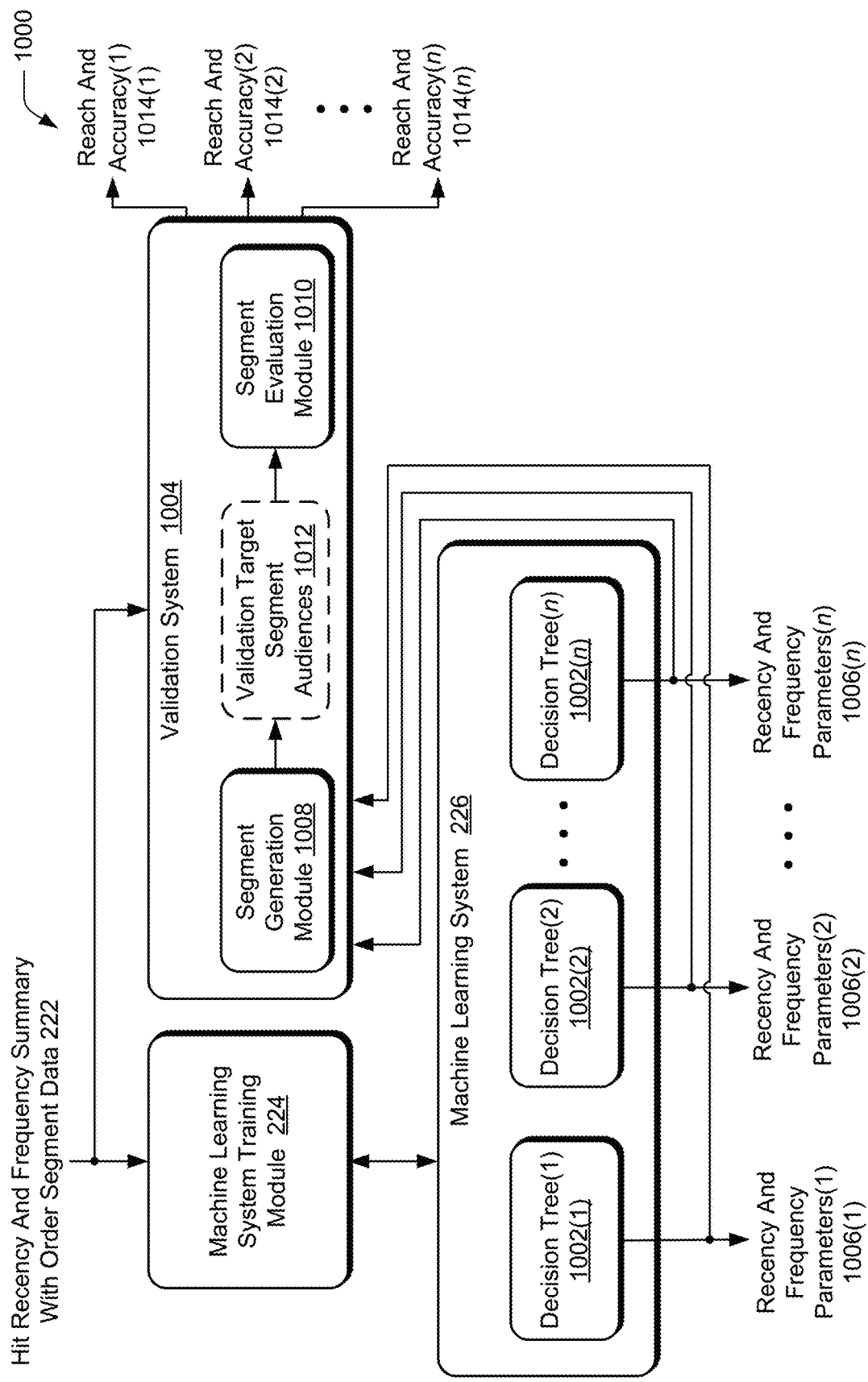
FIG. 10 illustrates an example of a machine learning system in additional detail.

FIG. 10 illustrates an example 1000 of a machine learning system in additional detail. In the illustrated example 1000 the machine learning system training module 224 trains the machine learning system 226. The machine learning system 226 is illustrated as including multiple (n) decision trees 1002(1), . . . , 1002(n), each with a different penalty ratio as discussed in more detail below. Although illustrated as decision trees, it should be noted that the machine learning system 226 can include multiple other types of machine learning models.

Each target segment audience has an accuracy and a reach. The accuracy of a target segment audience refers to how accurate the target segment audience is in identifying cookie identifiers corresponding to users that are interested in the segment. For example, the accuracy of the target segment audience is equal to the number of cookie identifiers in the target segment audience that satisfied a metric (e.g., ordered a product) in the segment divided by the number of cookie identifiers that are in the target segment audience. The reach of a target segment audience refers to how well the target segment audience identifies cookie identifiers corresponding to users that are interested in the segment. For example, the reach of the target segment audience is equal to the number of cookie identifiers in the target segment audience that satisfied a metric (e.g., ordered a product) in the segment divided by the number of cookie identifiers overall that satisfied a metric (e.g., ordered a product) in the segment.

Accuracy and reach are inversely related, so high accuracy couples with low reach and low accuracy couples with high reach. Depending on specific business goals, businesses may desire target segment audiences with different levels of accuracy and reach. Each decision tree 1002 is associated with a different false positive to false negative penalty ratio to achieve different levels of accuracy and reach. In one or more implementations, there are five decision trees 1002 each associated with a different one of five different false positive to false negative penalty ratios that are modelling parameters. A higher false positive to false negative penalty ratio penalizes the decision tree more during training if a negative result is incorrectly identified as a positive result, and a lower false positive to false negative penalty ratio penalizes the decision tree more during training if a positive result is incorrectly identified as a negative result. For example, decision tree 1002(1) can use a false positive to false negative penalty ratio of 1.5:1, decision tree 1002(2) can use a false positive to false negative penalty ratio of 1.25:1, decision tree 1002(3) can use a false positive to false negative penalty ratio of 1:1, decision tree 1002(4) can use a false positive to false negative penalty ratio of 1:1.25, and decision tree 1002(5) can use a false positive to false negative penalty ratio of 1:1.5. The false positive to false negative penalty ratio of 1.5:1 gives the highest reach but the lowest accuracy, whereas the false positive to false negative penalty ratio of 1:1.5 gives the lowest reach but the highest accuracy.

In one or more implementations, when training a machine learning model a cost function (an objective function) is minimized. When minimizing the cost function, using different false positive to false negative penalty ratios allows different costs to be associated with a false positive prediction (a negative result being incorrectly identified as a positive result) and a false negative prediction (a positive result being incorrectly identified as a negative result). For example, when minimizing the cost function a false positive to false negative ratio of 1:2 refers to the cost of one false negative prediction being double the cost of one false positive prediction (e.g., the cost of one false positive prediction being 1 and the cost of one false negative prediction being 2). Accordingly, in such a situation the machine learning system training module 224 trains the machine learning model to prefer making a mistake of false positive prediction rather than false negative prediction in order to minimize the cost function.

The machine learning system training module 224 obtains the hit recency and frequency summary with order segment data 222 and selects a portion of the data 222 to use as training data. For example, the machine learning system training module 224 can select approximately 75% of the data to use as training data. The portion not used by the machine learning system training module 224 as training data is used as validation data by a validation system 1004 as discussed in more detail below.

In one or more implementations, each decision tree 1002 is a binary classification model and the machine learning system training module 224 trains the machine learning system by applying a binary classification decision tree algorithm to train each decision tree 1002 with "order segment" as the target variable. The machine learning system training module 224 can use any of a variety of binary classification decision tree algorithms to train the decision trees 1002, such as the ID3 (Iterative Dichotomiser 3) Algorithm, the C4.5 Algorithm, and so forth. The machine learning system training module 224 prunes each decision tree 1002 to avoid overfitting the decision trees 1002, such as by setting a maximum tree depth of 3.

Each decision tree 1002 learns, with its associated false positive to false negative penalty ratio modelling parameter, the recency and frequency combinations of hits on webpages in each segment that work well to separate cookie identifiers that satisfied a metric for an offering in the target segment and cookie identifiers that satisfied a metric for an offering in other segments (e.g., cookie identifiers that ordered a product in segment A and cookie identifiers that ordered products in other segments). These recency and frequency combinations are output as the recency and frequency parameters 1006(1), . . . , 1006(n), and are collectively the recency and frequency parameters 228 of FIG. 2. In one or more implementations these recency and frequency combinations are generated in tree format by the decision trees 1002 and converted to rules (e.g., that can be implemented by the segment generation module 114 of FIG. 1 or by the validation system 1004) by the machine learning system training module 224.

By way of example, a recency and frequency combination may be that $A\_90 \geq 1$ and $A\_180 \geq 4$. In other words, the cookie identifier had at least 1 segment A webpage hit within the past 90 days and had at least 4 segment A webpage hits within the past 180 days. By way of another example, a recency and frequency combination may be that $A\_90 \geq 1$ and $A\_180 < 4$ but $B\_180 < 1$. In other words, the cookie identifier had at least 1 segment A webpage hit within the past 90 days and had less than 4 segment A webpage hits within the past 180 days, but did not have any segment B webpage hit within the past 180 days.

It should be noted that the machine learning system training module 224 can train the machine learning system 226 at any of a variety of different times. For each change in the target segment audience criteria 204, or in response to a user request (e.g., due to new browsing data 120 have been collected since the machine learning system 226 was trained), the machine learning system training module 224 trains the machine learning system 226. In some situations the machine learning system training module 224 can train the machine learning system 226 quickly, for example in the range of a few to fifteen minutes. This is due to, for example, the relatively small amount of data, relative to the amount of data in the browsing data 120, that is used to train the machine learning system 226 because the training data is based on the cookie level timestamp and order segment identification data 214. Accordingly, the training data is based on cookie identifiers with hit occurrences that resulted in a metric being satisfied as opposed to all of the data in the browsing data 120.

The validation system 1004 includes a segment generation module 1008 and a segment evaluation module 1010. The segment generation module 1008 applies, for each decision tree 1002, the recency and frequency parameters 1006 generated by the decision tree 1002 to the validation data to generate a validation target segment audience 1012. For example, the segment generation module 1008 searches the validation data for cookie identifiers that satisfy the recency and frequency parameters 1006(1) and uses those cookie identifiers as one validation target segment audience 1012, searches the validation data for cookie identifiers that satisfy the recency and frequency parameters 1006(2) and uses those cookie identifiers as another validation target segment audience 1012, and so forth.

In one or more implementations, the segment generation module 1008 also generates a validation target segment audience 1012 referred to as a baseline target segment audience. The segment generation module 1008 generates the segment generation module 1008 using a baseline technique that is a traditional approach for determining the frequency and recency, such as using a frequency of 1 and no limit for recency. For example, the segment generation module 1008 searches the validation data for cookie identifiers that had at least 1 segment A webpage hit (at any time before the first hit of a metric satisfaction session).

The segment evaluation module 1010 analyzes each validation target segment audience 1012 generated by the segment generation module 1008 to identify and output reach and accuracy 1014(1), . . . , 1014(n) for each validation target segment audience 1012. In one or more implementations, the segment evaluation module 1010 generates the reach and accuracy for each validation target segment audience 1012, outputting the generated reach and accuracy as reach and accuracy 1014(1), . . . , 1014(n). For example, assume that for one target segment audience generated for a segment A, there are 2575 cookie identifiers in the target segment audience that satisfied a metric (e.g., ordered a product) in segment A and 7725 cookie identifiers in the target segment audience that did not satisfy the metric (e.g., did not order a product) in segment A. The accuracy of the target segment audience is 2575/2575+7725, which is 0.25, or 25%. Further assume that the validation data includes 6130 cookie identifiers that satisfied the metric (e.g., ordered a product) in segment A. The reach of the target segment audience is 2575/6130, which is 0.42, or 42%.

Returning to FIG. 2, the segment generation module 114 receives the recency and frequency parameters 228 along with their corresponding reach and accuracy values. The segment generation module 114 saves these received parameters and values for later use in generating target segment audiences. These received parameters and values can be stored in various locations, such as storage 118 of FIG. 1. The segment generation module 114 also receives the browsing data 120 and the target segment audience criteria 204.

Figure 11:
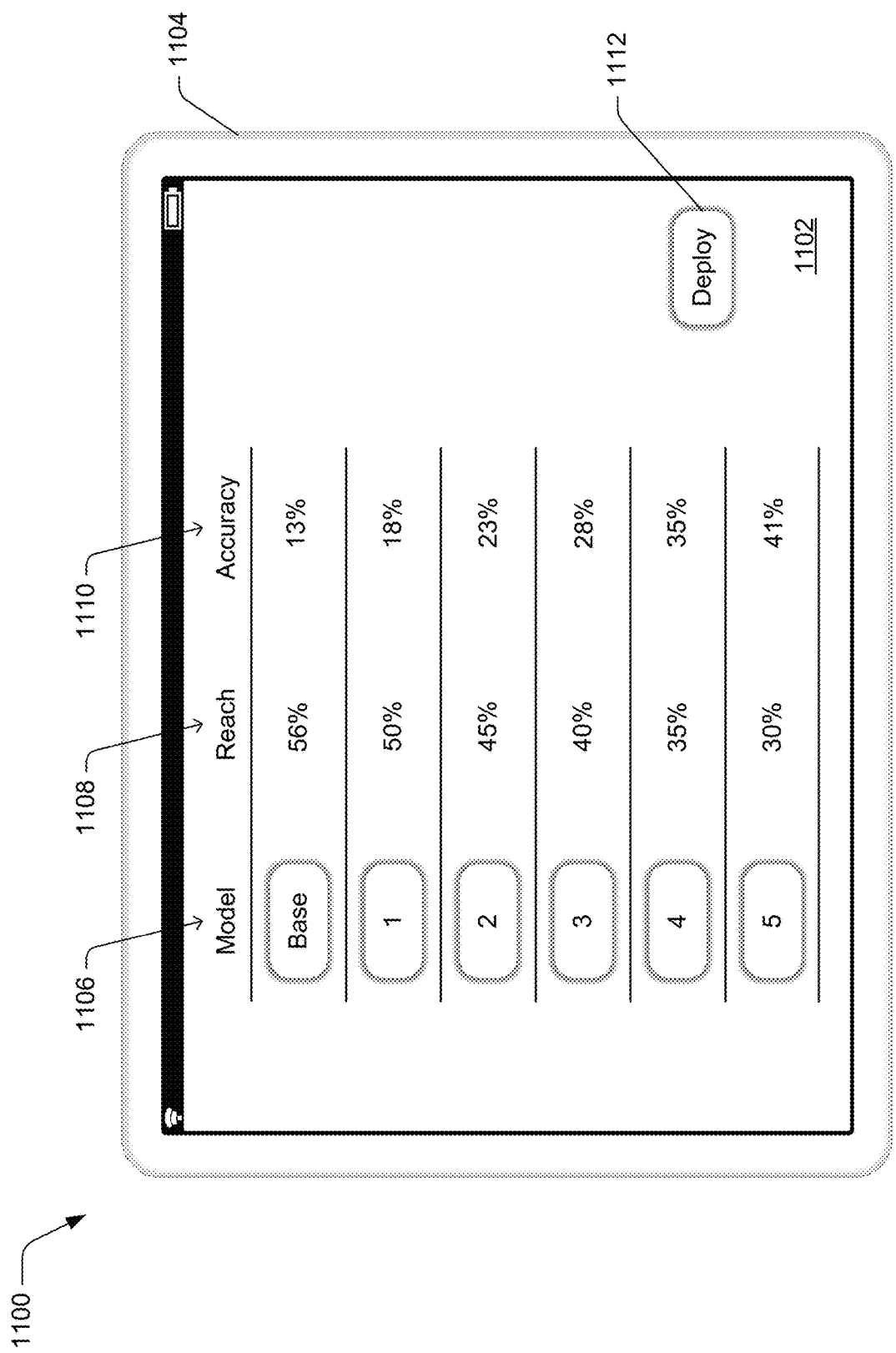
FIG. 11 illustrates an example display of the model options available to the user.

In one or more implementations, the segment generation module 114 displays or otherwise presents to a user of the segment targeting system 102 options for the user to select which model the user desires to use to generate a target segment audience. FIG. 11 illustrates an example display 1100 of the model options available to the user. As illustrated in the example 1100, a user interface 1102 is shown as displayed on a display device 1104. A column 1106 identifies the model. The "base" model refers to using a baseline technique as discussed above, which uses a traditional approach for determining the frequency and recency, such as using a frequency of 1 and no limit for recency, rather than the machine learning system 226. The numbered models each refer to using a different model of the machine learning system 226 (e.g., a different decision tree 1002(1), . . . , 1002(n) of FIG. 10). A column 1108 identifies the reach of the target segment audience generated using the corresponding model, and a column 1110 identifies the accuracy of the target segment audience using the corresponding model.

The user can select one of the models in any of a variety of different manners. For example, the user can click on or touch one of the model identifiers, the user can provide a voice input specifying the name or number of the target segment audience, and so forth.

The target segment audience corresponding to the selected model is then deployed by the segment generation module 114. Deploying the target segment audience refers to applying the recency and frequency parameters 228 generated by the selected model to the browsing data 120. The segment generation module 114 searches the browsing data 120 for cookie identifiers that satisfy the recency and frequency parameters 228 generated by the selected model, and uses those cookie identifiers as the target segment audience 136. Additionally or alternatively, the target segment audience 136 can be made up of other identifiers of the user, such as email addresses associated with the cookie identifiers that satisfy the recency and frequency parameters 228 generated by the selected model. The target segment audience can be deployed in response to user selection of a model, additionally or alternatively in response to user selection of a deploy command or button, such as button 1112.

It should be noted that in FIGS. 10 and 11 multiple different models are discussed as being included in the machine learning system 226, each generating recency and frequency parameters that have different reaches and accuracies. Additionally or alternatively, the machine learning system 226 can include a single model, such as a single decision tree. In such situations, the reach and accuracy need not be displayed as there are not multiple models to select from. Additionally or alternatively, the reach and accuracy can be displayed to the user of the segment targeting system 102 for informational purposes.

Additionally or alternatively, the reach and accuracy for the different model options may not be displayed to the user. Rather, the user may be given multiple other options to choose from, such as a "use the most accurate one" button or a "use the one with the greatest reach" button. In response to user selection of one of these options, the segment generation module 114 generates the target segment audience using the model corresponding to the user selected option. For example, if the user selected a "use the most accurate one", the segment generation module 114 generates the target segment audience using model 5 (having 41% accuracy). By way of another example, if the user selected a "use the one with the greatest reach", the segment generation module generates the target segment audience using the baseline technique (having a 56% reach).

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-11.

Figure 12:
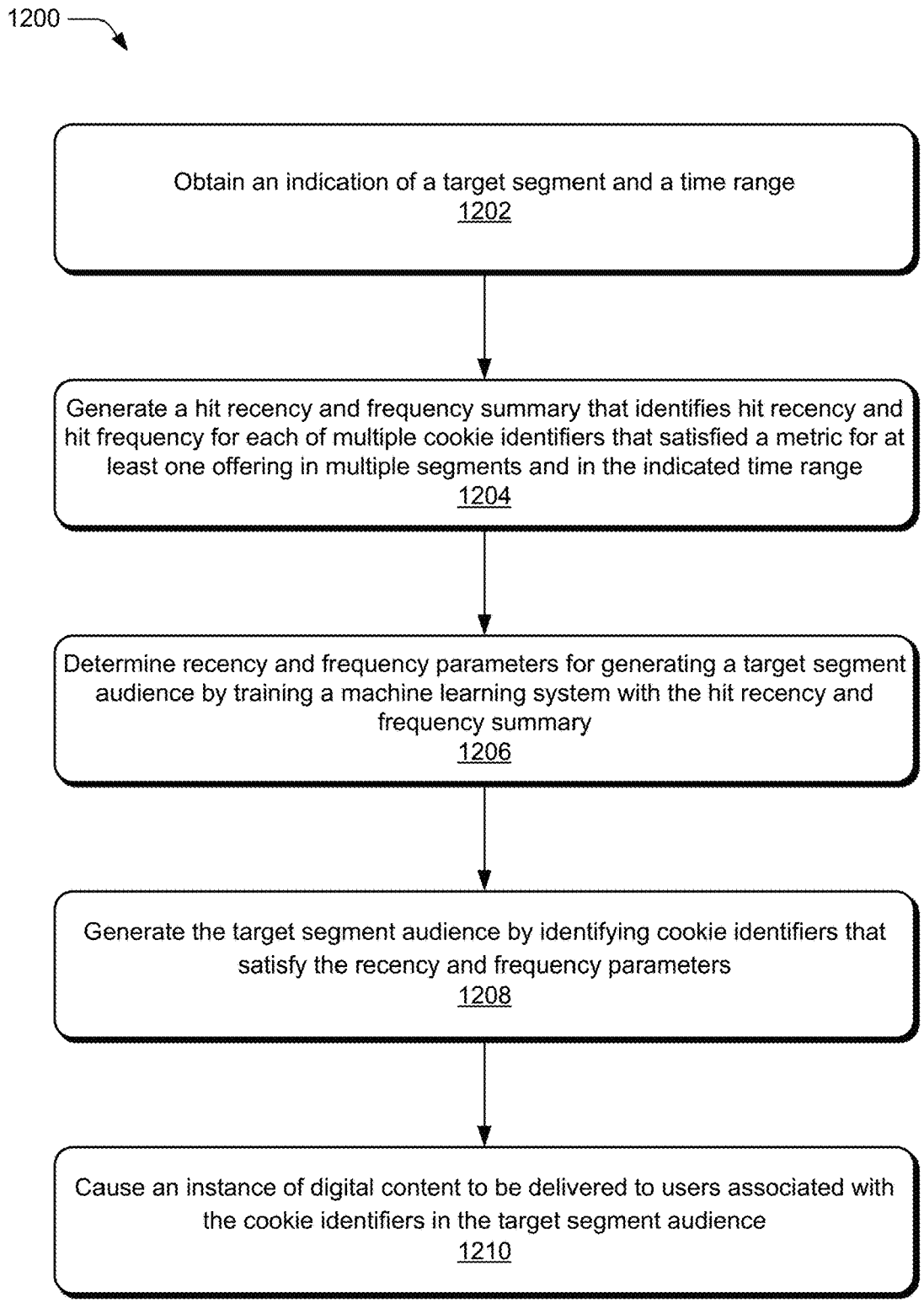
FIG. 12 is a flow diagram depicting a procedure in an example implementation of machine learning assisted target segment audience generation

FIG. 12 is a flow diagram depicting a procedure in an example 1200 implementation of machine learning assisted target segment audience generation. In this example, an indication of a target segment and a time range is obtained (block 1202). The target segment is an identifier of a group or category that includes one or more offerings. The target segment is one of multiple segments each of which is an identifier of a different group or category that includes one or more offerings. The target segment and time range can be obtained in various manners, such as by receiving user inputs specifying the segment and time range.

A hit recency and hit frequency summary that identifies hit recency and hit frequency for each of multiple cookie identifiers that satisfied a metric for at least one offering in the multiple segments in the time range is generated (block 1204). The hit recency identifies how recently hits occurred, for a cookie identifier, on at least one webpage corresponding to one of the multiple segments prior to the cookie identifier satisfying the metric. The hit frequency identifies how frequently, for the cookie identifier, hits occurred on at least one webpage corresponding to one of the multiple segments prior to the cookie identifier satisfying the metric.

Recency and frequency parameters for generating a target segment audience for the target segment and the time range are determined by training a machine learning system with the hit recency and frequency summary (block 1206). The recency and frequency parameters are parameters used in generating a target segment audience for the target segment and the time range.

The target segment audience is generated by identifying cookie identifiers that satisfy the recency and frequency parameters (block 1208). The recency and frequency parameters that are used are optionally parameters corresponding to a user selected model having a particular reach and accuracy as discussed above.

An instance of digital content is caused to be delivered to users associated with the cookie identifiers in the target segment audience (block 1210). The instance of digital content can be caused to be delivered to users in the target segment audience in various manners. For example, a segment targeting system can communicate the target segment audience to a particular content delivery platform. The content delivery platform then delivers an instance of digital content to users identified in the target segment audience.

Example System and Device

Figure 13:
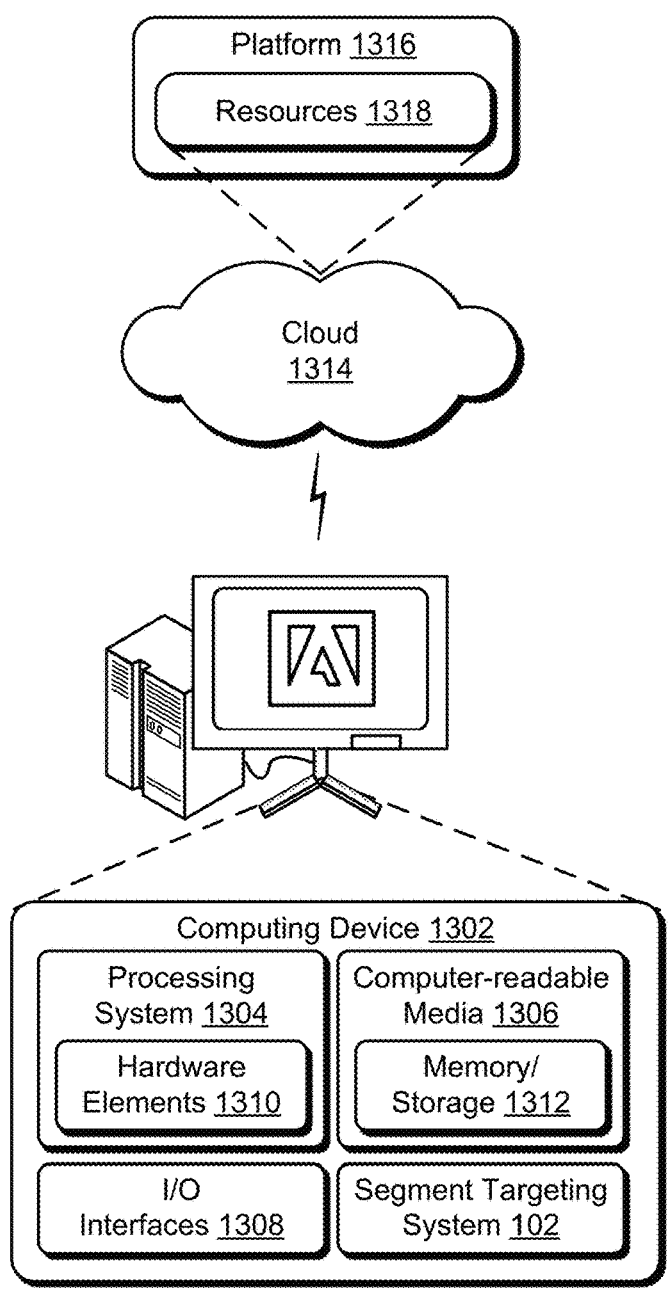
FIG. 13 illustrates an example system including various components of an example device that can be implemented as any type of computing device as described and/or utilize with reference to FIGS. 1-12 to implement aspects of the techniques described herein.

FIG. 13 illustrates an example system generally at 1300 that includes an example computing device 1302 that is representative of one or more computing systems and/or devices that may implement the various techniques described herein. This is illustrated through inclusion of the segment targeting system 102. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. In a digital medium environment to cause an instance of digital content to be delivered to a client device associated with a user in a target segment audience, a method implemented by at least one computing device, the method comprising:
  obtaining, by the at least one computing device, an indication of a target segment and a time range, the target segment being one of multiple segments each of which comprises an identifier of a different group that includes one or more offerings;
  generating, by the at least one computing device, a hit recency and frequency summary that identifies hit recency and hit frequency for each of multiple cookie identifiers that satisfied a metric for at least one offering in the multiple segments in the time range, the generated hit recency and frequency summary identifying multiple recency groupings corresponding to a recency of each hit for each cookie identifier, wherein each recency grouping corresponds to a different threshold amount of time prior to a cookie identifier satisfying the metric and includes hit occurrences having occurred on at least one webpage corresponding to one of the multiple segments within that respective threshold amount of time the hit frequency identifying how frequently, for each cookie identifier and for each of the multiple recency groupings, hits occurred on the at least one webpage corresponding to one of the multiple segments prior to the cookie identifier satisfying the metric;
  training, by the at least one computing device and using the hit recency and frequency summary, using supervised learning each of multiple machine learning models of a machine learning system to determine recency and frequency parameters for generating a target segment audience for the target segment and the time range, each of the multiple machine learning models being associated with a different false positive to false negative penalty ratio modelling parameter to achieve different levels of accuracy and reach for the recency and frequency parameters;

generating, by the at least one computing device, the target segment audience by identifying cookie identifiers that satisfy the recency and frequency parameters of one of the multiple machine learning systems; and causing, by the at least one computing device, the instance of digital content to be delivered to users associated with the cookie identifiers in the target segment audience.

2. The method as recited in claim 1, further comprising receiving user input specifying the target segment.

3. The method as recited in claim 1, further comprising receiving user input specifying the time range.

4. The method as recited in claim 1, the hit recency identifying how may days prior to the cookie identifier satisfying the metric hits, for the cookie identifier, on at least one webpage corresponding to one of the multiple segments occurred.

5. The method as recited in claim 1, for each of the multiple machine learning models, the accuracy of the machine learning model is equal to a number of cookie identifiers in the target segment audience that satisfied the metric for the segment divided by a number of cookie identifiers in the target segment audience for the segment, and the reach of the machine learning model is equal to a number of cookie identifiers in the target segment audience that satisfied the metric for the segment divided by a number of cookie identifiers overall that satisfied the metric for the segment.

6. The method as recited in claim 5, the method further comprising:
  determining, for each of the multiple machine learning models, accuracy and reach values for the recency and frequency parameters identified by the machine learning model;
  displaying, for each of the multiple machine learning models, the accuracy and reach values for the recency and frequency parameters identified by the machine learning model;
  receiving user input identifying a user selected one of the multiple machine learning models; and
  the generating the target segment audience comprising generating the target segment audience by identifying cookie identifiers that satisfy the recency and frequency parameters corresponding to the user selected one of the multiple machine learning models.

7. The method as recited in claim 1, each machine learning model comprising a decision tree.

8. The method as recited in claim 1, each of the multiple recency groupings corresponding to a hit occurrence having occurred on at least one webpage corresponding to one of the multiple segments within a different threshold number of days.

9. The method as recited in claim 1, the recency and frequency parameters including one or more rules identifying recency and frequency combinations for offerings in the target segment, as well as one or more rules identifying recency and frequency combinations for offerings in other segments of the multiple segments.

10. A system comprising:
  a segment manager module implemented at least partially in hardware of at least one computing device and configured to determine recency and frequency parameters, the segment manager module being configured to:
    obtain an indication of a target segment and a time range, the target segment being one of multiple segments each of which comprises an identifier of a different group that includes one or more offerings;
    generate a hit recency and frequency summary that identifies hit recency and hit frequency for each of multiple cookie identifiers that satisfied a metric for at least one offering in the multiple segments in the time range, the generated hit recency and frequency summary identifying multiple recency groupings corresponding to a recency of each hit for each cookie identifier, wherein each recency grouping corresponds to a different threshold amount of time prior to a cookie identifier satisfying the metric and includes hit occurrences having occurred on at least one webpage corresponding to one of the multiple segments within that respective threshold amount of time, the hit frequency identifying how frequently, for each cookie identifier and for each of the multiple recency groupings, hits occurred on the at least one webpage corresponding to one of the multiple segments prior to the cookie identifier satisfying the metric;
    train, using the hit recency and frequency summary, each of multiple decision trees to determine recency and frequency parameters for generating a target segment audience for the target segment and the time range; and
    generate the target segment audience by identifying cookie identifiers that satisfy the recency and frequency parameters of one of the multiple decision trees; and
  a segment generation module implemented at least partially in hardware of at least one computing device and configured to generate, by identifying cookie identifiers that satisfy the recency and frequency parameters, a target segment audience of users for digital content delivery via a content delivery platform.

11. The system as recited in claim 10, wherein the segment manager module is further configured to receive user input specifying the target segment and the time range.

12. The system as recited in claim 10, the hit recency identifying how many days prior to the cookie identifier satisfying the metric hits, for the cookie identifier, on at least one webpage corresponding to one of the multiple segments occurred.

13. The system as recited in claim 10, each of the multiple decision trees identifying recency and frequency parameters, each of the multiple decision trees being associated with a different false positive to false negative penalty ratio modelling parameter to achieve different levels of accuracy and reach for the recency and frequency parameters, and, for each of the multiple decision trees, the accuracy of the decision tree is equal to a number of cookie identifiers in the target segment audience that satisfied the metric for the segment divided by a number of cookie identifiers in the target segment audience for the segment, and the reach of the decision tree is equal to a number of cookie identifiers in the target segment audience that satisfied the metric for the segment divided by a number of cookie identifiers overall that satisfied the metric for the segment.

14. The system as recited in claim 13, wherein the segment manager module is further configured to:
  determine, for each of the multiple decision trees, accuracy and reach values for the recency and frequency parameters identified by the decision tree;
  display, for each of the multiple decision trees, the accuracy and reach values for the recency and frequency parameters identified by the decision tree;

receive user input identifying a user selected one of the multiple decision trees; and generate the target segment audience by identifying cookie identifiers that satisfy the recency and frequency parameters corresponding to the user selected one of the multiple decision trees.

15. The system as recited in claim 10, each of the multiple recency groupings corresponding to a hit occurrence having occurred on at least one webpage corresponding to one of the multiple segments within a different threshold number of days.

16. The system as recited in claim 10, the recency and frequency parameters including one or more rules identifying recency and frequency combinations for offerings in the target segment, as well as one or more rules identifying recency and frequency combinations for offerings in other segments.

17. A system comprising:

at least one computing device;

means for generating, by the at least one computing device, a hit recency and frequency summary that identities hit recency and hit frequency for each of multiple cookie identifiers that satisfied a metric for at least one offering in multiple segments and in a time range, each of the multiple segments comprising an identifier of a different group that includes one or more offerings, the generated hit recency and frequency summary identifying multiple recency groupings corresponding to a recency of each hit for each cookie identifier, wherein each recency grouping corresponds to a different threshold amount of time prior to a cookie identifier satisfying the metric and includes hit occurrences having occurred on at least one webpage corresponding to one of the multiple segments within that respective threshold amount of time, the hit frequency identifying how frequently, for each cookie identifier and for each of the multiple recency groupings, hits occurred on the at least one webpage corresponding to one of the multiple segments prior to the cookie identifier satisfying the metric;

means for training, by the at least one computing device, using the hit recency and frequency summary, each of multiple decision trees to determine recency and frequency parameters for generating a target segment audience for a target segment and the time range; and a segment generation module configured to generate the target segment audience by identifying cookie identifiers that satisfy the recency and frequency parameters.

18. The system as recited in claim 17, each of the multiple decision trees identifying recency and frequency parameters, each of the multiple machine learning models being associated with a different false positive to false negative penalty ratio modelling parameter to achieve different levels of accuracy and reach for the recency and frequency parameters, and, for each of the multiple decision trees, the accuracy of the decision tree is equal to a number of cookie identifiers in the target segment audience that satisfied the metric for the segment divided by a number of cookie identifiers in the target segment audience for the segment, and the reach of the decision tree is equal to a number of cookie identifiers in the target segment audience that satisfied the metric for the segment divided by a number of cookie identifiers overall that satisfied the metric for the segment.

19. The system as recited in claim 18, wherein the segment generation module is further configured to:

determine, for each of the multiple decision trees, accuracy and reach values for the recency and frequency parameters identified by the decision tree;

display, for each of the multiple decision trees, the accuracy and reach values for the recency and frequency parameters identified by the decision tree;

receive user input identifying a user selected one of the multiple decision trees; and generate the target segment audience by identifying cookie identifiers that satisfy the recency and frequency parameters corresponding to the user selected one of the multiple decision trees.

20. The system as recited in claim 17, the recency and frequency parameters including one or more rules identifying recency and frequency combinations for offerings in the target segment, as well as one or more rules identifying recency and frequency combinations for offerings in other segments of the multiple segments.

* * * * *

UNITED STATES PATENT AND TRADEMARK OFFICE
CERTIFICATE OF CORRECTION

PATENT NO. : 10,943,267 B2
APPLICATION NO. : 16/409300
DATED : March 9, 2021
INVENTOR(S) : Lei Liu Page 1 of 1

It is certified that error appears in the above-identified patent and that said Letters Patent is hereby corrected as shown below:

In the Claims

Column 25, Line 21, after "frequency summary that", delete "indentities", insert -- indentifies --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*